United States Patent
Pandita et al.

(10) Patent No.: US 9,460,624 B2
(45) Date of Patent: Oct. 4, 2016

(54) METHOD AND APPARATUS FOR DETERMINING LANE IDENTIFICATION IN A ROADWAY

(71) Applicant: Toyota Motor Engineering & Manufacturing North America, Inc., Erlanger, KY (US)

(72) Inventors: Rohit Pandita, Ann Arbor, MI (US); John-Michael McNew, Ann Arbor, MI (US); Derek S Caveney, Ann Arbor, MI (US); Vladimeros Vladimerou, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 112 days.

(21) Appl. No.: 14/271,306

(22) Filed: May 6, 2014

(65) Prior Publication Data
US 2015/0325127 A1 Nov. 12, 2015

(51) Int. Cl.
*G08G 1/16* (2006.01)
*G01C 21/28* (2006.01)

(52) U.S. Cl.
CPC ............. *G08G 1/16* (2013.01); *G01C 21/28* (2013.01); *G08G 1/166* (2013.01); *G08G 1/167* (2013.01)

(58) Field of Classification Search
CPC ............ G06K 9/00798; B60W 2420/42; B60W 30/12; G08G 1/09626
USPC .................................................. 701/22, 431
See application file for complete search history.

(56) References Cited

U.S. PATENT DOCUMENTS

| | | | |
|---|---|---|---|
| 5,790,403 A | 8/1998 | Nakayama | |
| 5,995,895 A | 11/1999 | Watt et al. | |
| 6,107,939 A | 8/2000 | Sorden | |
| 6,292,752 B1 | 9/2001 | Franke et al. | |
| 7,742,872 B2 | 6/2010 | Kimura et al. | |
| 7,970,529 B2 | 6/2011 | Mori et al. | |
| 7,979,172 B2 | 7/2011 | Breed | |
| 8,036,788 B2 | 10/2011 | Breed | |
| 8,112,222 B2 | 2/2012 | Nakao et al. | |
| 8,346,473 B2 | 1/2013 | Nakamura et al. | |
| 8,363,104 B2 | 1/2013 | Imai et al. | |
| 8,385,600 B2 | 2/2013 | Nara et al. | |
| 8,452,535 B2 | 5/2013 | Zeng et al. | |
| 2002/0042668 A1* | 4/2002 | Shirato | G06K 9/00798 701/1 |

(Continued)

FOREIGN PATENT DOCUMENTS

| | | |
|---|---|---|
| CN | 103339009 A | 10/2013 |
| DE | 10118265 A1 | 10/2002 |

(Continued)

*Primary Examiner* — Jelani Smith
(74) *Attorney, Agent, or Firm* — Christopher G. Darrow; Darrow Mustafa PC

(57) ABSTRACT

A method and apparatus for determining a lane identity of a vehicle travelling in a roadway where the roadway contains a plurality of lanes is determined based on information from sensors associated with the vehicle and map data for detecting the lane marker type to a left side and right side of the vehicle, any lane crossings during travel of the vehicle along the roadway, a history of lane marker type up to a predetermined travel distance along the roadway, and the lane marker type at the instantaneous position of the vehicle in the roadway. The lane identity method and apparatus outputs a confidence belief identifying the probability that the vehicle is traveling in one particular lane of the roadway.

18 Claims, 9 Drawing Sheets

(56) References Cited

U.S. PATENT DOCUMENTS

| | | |
|---|---|---|
| 2003/0156015 A1 | 8/2003 | Winner et al. |
| 2005/0169501 A1 | 8/2005 | Fujii et al. |
| 2007/0021912 A1 | 1/2007 | Morita et al. |
| 2007/0041614 A1 | 2/2007 | Tanji |
| 2007/0043506 A1 | 2/2007 | Mudalige et al. |
| 2007/0168113 A1 | 7/2007 | Litkouhi et al. |
| 2008/0161986 A1 | 7/2008 | Breed |
| 2010/0121518 A1* | 5/2010 | Tiernan ............... G01C 21/30 701/26 |
| 2010/0121569 A1* | 5/2010 | Nakamura ........... G01C 21/30 701/532 |
| 2010/0332127 A1* | 12/2010 | Imai .................... B60W 30/12 701/532 |
| 2011/0234450 A1 | 9/2011 | Sakai et al. |
| 2013/0274986 A1 | 10/2013 | Trepagnier et al. |
| 2013/0297140 A1 | 11/2013 | Montemerlo et al. |
| 2014/0257686 A1* | 9/2014 | Feldman ............... G06F 17/00 701/300 |

FOREIGN PATENT DOCUMENTS

| | | |
|---|---|---|
| JP | 2011525164 A | 9/2011 |
| JP | 2011219089 | 11/2011 |
| WO | 2007115775 A1 | 10/2007 |
| WO | 2013149149 A1 | 10/2013 |

\* cited by examiner

METHOD AND APPARATUS FOR DETERMINING LANE IDENTIFICATION IN A ROADWAY

BACKGROUND

The present method and apparatus relates, in general, to vehicle driver alerting apparatus and methods.

Partially automated or monitored vehicle driving systems are designed to assist drivers in operating a vehicle safely and efficiently on a road, for example, using techniques such as eye-tracking of the driver to send a warning when the driver becomes inattentive, lane tracking of the vehicle to send a warning to the driver when the vehicle is leaving its lane, and controlling vehicle velocity based on distance to a vehicle ahead of the driver when adaptive cruise control is activated by the driver. Fully automated driving systems are designed to operate a vehicle on the road without driver interaction or other external control, for example, self-driving or autonomous vehicles.

SUMMARY

A method of determining a lane identity in a roadway in which a vehicle is traveling, where the roadway contains a plurality of lanes includes a computing device including at least one processor mounted on the vehicle and coupled to sensors; a memory for storing data and program instructions used by the at least one processor, where the at least one processor executes program instructions stored in the memory to obtain lane marker type to the left side and to the right side of the vehicle in a forward direction of travel of the vehicle from one of the sensors, obtain an instantaneous position of the vehicle on the roadway using one of the sensors; determine the number of lanes in the roadway at the instantaneous position of the vehicle using map data stored in the memory, detects lane crossings of the vehicle between the plurality of lanes in the roadway using at least one of the sensors, and generates a lane identification confidence belief indicating a probability that the vehicle is in a particular lane of the plurality of lanes of the roadway based on any detected lane crossings, the number of lanes in the roadway, a history of lane marker type up to a predetermined travel distance, and the lane marker type at the instantaneous position of the vehicle in the roadway.

One of the sensors can be a camera mounted on the vehicle to obtain lane marker type of at least one of lane and a lane crossing.

The method for determining the instantaneous position of the vehicle can use a global positioning satellite system, at least a portion of which is carried by the vehicle.

The method determines the number of lanes in the roadway at the instantaneous position of the vehicle using data in the memory accessed by the at least one processor.

The method detects lane crossings of the vehicle by a camera mounted on the vehicle.

The confidence belief is updated by the actual distance traveled by the vehicle within a predetermined travel distance and the detection of any lane crossings, when the actual distance traveled by the vehicle equals the predetermined travel distance.

The method outputs the lane identification in which the vehicle is currently traveling in the roadway and a probability that the vehicle is in one particular lane corresponding to the lane identification.

A computer implemented method of determining which lane of a roadway containing multiple lanes the vehicle is currently traveling comprises at least one processor mounted on the vehicle and coupled to sensors; a memory for storing data and program instructions used by the at least one processor, where the at least one processor executes program instructions stored in the memory to obtain lane marker type to a left side and to a right side of the vehicle in a forward direction of travel of the vehicle from at least one of the sensors to obtain an instantaneous position of the vehicle on the roadway, uses one of the sensors to determine the number of lanes in the roadway at the instantaneous position of the vehicle, uses map data stored in the memory to detect lane crossings of the vehicle between the plurality of lanes of the roadway; and generates a lane identification confidence belief indicating a probability that the vehicle is in a particular lane of the plurality of lanes of the roadway based on a predetermined travel distance in a particular lane, any detected lane crossings, the number of lanes in the roadway, a history of lane marker type up to a predetermined travel distance, and the lane marker type at the instantaneous position of the vehicle in the roadway.

The computer implemented method includes using a camera, a GPS system and map data accessed by the at least one processor to respectively determine the instantaneous position of the vehicle on a roadway, the lane marker type to the left side and to the right side of the vehicle, and the number of lanes in the roadway at the instantaneous position of the vehicle.

A computing device associated with a vehicle for determining the lane identity of the vehicle traveling a roadway having a plurality of lanes comprises a computing device including at least one processor mounted on the vehicle and coupled to sensors and a memory for storing data and program instructions used by the at least one processor, where the at least one processor executes program instructions stored in the memory and uses one or more sensors mounted on the vehicle to detect lane marker type to a left side and a right side of the vehicle at each instantaneous position of the vehicle in the roadway as well as detecting lane changes of the vehicle in the roadway, uses one of the sensors or map data for determining the number of lanes in the roadway at the instantaneous position of the vehicle detects lane crossings of the vehicle between the plurality of lanes in the roadway using one of the sensors, and generates a lane identification confidence belief indicating a probability that the vehicle is in a particular lane of the plurality of lanes of the roadway based on any detected lane crossings, the number of lanes in the roadway, the history of lane marker type up to a predetermined travel distance of the vehicle along the roadway, and the lane marker type at the instantaneous position of the vehicle in the roadway.

BRIEF DESCRIPTION OF THE DRAWING

The various features, advantages, and other uses of the present method and apparatus will become more apparent by referring to the following detailed description and drawing in which.

DETAILED DESCRIPTION

Figure 1:
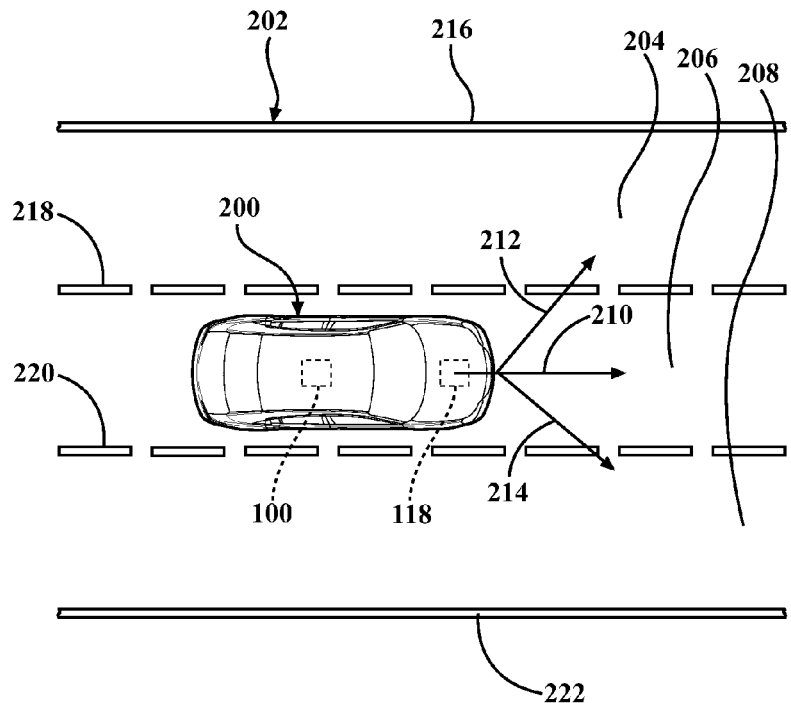
FIG. 1 is a pictorial representation of a vehicle traveling in a forward direction along a roadway containing multiple lanes.

Referring now the drawing, and to FIGS. 1-10 in particular, there is depicted a method and apparatus for identifying the current travel lane of a vehicle in a roadway containing multiple lanes.

Figure 2:
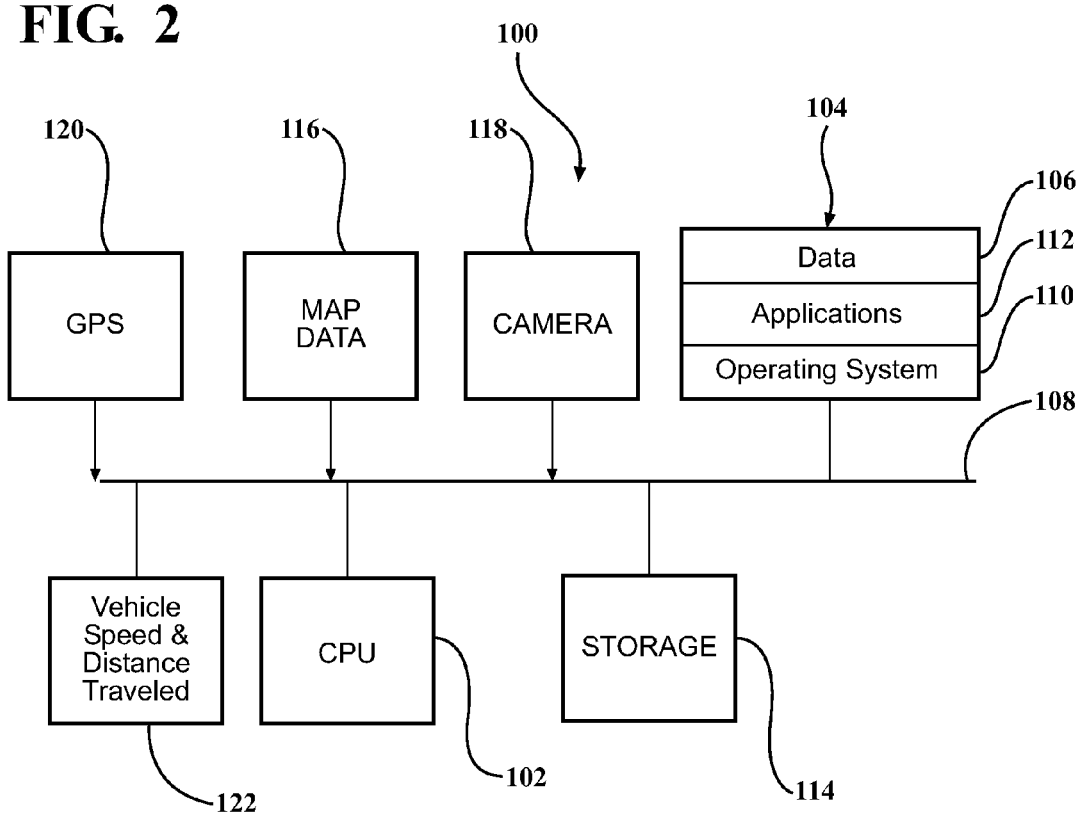
FIG. 2 is a block diagram of a computing device for implementing the road lane identification method and apparatus.

FIG. 2 is a block diagram of a computing device 100 for implementing the method and apparatus for determining lane identification of a vehicle in a roadway. The computing device 100 can be any type of vehicle-installed, handheld, desktop, or other form of single computing device, or can be composed of multiple computing devices. The processing unit or processor 102 in the computing device can be a conventional central processing unit (CPU) or any other type of device, or multiple devices, capable of manipulating or processing information. The memory 104 in the computing device can be a random access memory device (RAM) or any other suitable type of storage device. The memory 104 can include data 106 that is accessed by the CPU 102 using a bus 108.

The memory 104 can also include an operating system 110 and installed applications 112. The installed applications 112 can include programs that permit the processor 102 to perform the automated driving methods and to operate the apparatus as described below. The computing device 100 can also include secondary, additional, or external storage 114, for example, a memory card, flash drive, or any other form of computer readable medium. The installed applications 112 can be stored in whole or in part in the external storage 114 and loaded into the memory 104 as needed for processing.

The computing device 100 can also be coupled to one or more sensors 118, 120 and 122. The sensors 118, 120 and 122 can capture data and/or signals for processing by an inertial measurement unit (IMU), a dead-reckoning system, a global navigation satellite system (GPS), a light detection and ranging (LIDAR) system, a radar system, a sonar system, an image-based sensor system, or any other type of system capable of capturing features of the route being travelled by the vehicle, or other localized position data and/or signals and outputting corresponding data and/or signals to the processor 102.

The sensors 118 and 120 can also capture data representative of changes in x, y, and z-axis position, velocity, acceleration, rotation angle, and rotational angular rate for the vehicle and similar data for objects proximate to the navigation route of the vehicle. If the sensors 118 and 120 capture data for a dead-reckoning system, data relating to wheel revolution speeds, travel distance, steering angle, and steering angular rate of change can be captured. If the sensors capture signals for a GPS 120, a GPS receiver can calculate vehicle position and velocity estimated in global coordinates. A plurality of satellites can be used to estimate the vehicle's position and velocity using three-dimensional triangulation and time estimation.

FIG. 1 shows a schematic of a vehicle 200 carrying the computing device 100 shown in FIG. 2. The computing device 100 can be located within the vehicle 200 as shown in FIG. 1 or it can be located remotely from the vehicle 200 in an alternate location (not shown). If the computing device 100 is located remotely from the vehicle, the vehicle 200 can include the capability of communicating with the computing device 100.

The vehicle 200 can also include a plurality of sensors, such as the sensors 118, 120 and 122 described in reference to FIG. 2. One or more of the sensors 118, 120 and 122 can be configured to capture changes in velocity, acceleration, wheel revolution speed, and distance to objects within the surrounding environment for use by the computing device 100 to estimate position and orientation of the vehicle, steering angle for a dead-reckoning system, images for processing by an image sensor, vehicle position in global coordinates based on signals from a plurality of satellites, or any other data and/or signals that could be used to determine the current state of the vehicle or determine the position of the vehicle 200 in respect to its environment.

For example, if the sensor 118 are configured to capture data for use by a black and white camera or by a LIDAR system, the sensor 118 can capture data related to laser returns from physical objects in the area surrounding the vehicle 200 with ranging distances calculated by measuring the time it takes for a signal to return to the sensor 118. Laser or light returns can include the backscattered light reflected by objects hit by a source of light, e.g. laser light, being emitted by the sensor 118 or another source on or proximate to the vehicle 200. Once the light is reflected by an object, the sensor 118 can capture intensity values and reflectivity of each point on the object to be used for analyzing and classifying the object, for example, by the processor 102, one of the applications 112 stored within or accessible to the computing device 100.

In FIG. 1, the vehicle 200 is shown as moving in a forward direction along a roadway 202 which contains multiple side-by-side lanes, with three lanes 204, 206 and 208 being shown by example. It will be understood that the roadway 202 may contain as few as two lanes for four or more lanes.

The sensor or camera 118 has a field of view directed to the front, to the left side and to the right side of the vehicle as respectively shown by the directional arrows 210, 212 and 214. This arrangement allows the camera 118 to detect surface features of the roadway 202, such as lane markers. The roadway 202 can be a highway or freeway with typical lane markers, such as a solid continuous lane marker 216 at the left edge (in the direction of vehicle travel) of the left most lane 204, dashed lane markers 218 and 220 respectively defining the right edge of the left most lane 204 and the right edge of the middle lane 206. The right most lane 208 is delimited at a right edge by a solid continuous lane marker 222. The sensor or camera 118 can have the field of view shown in FIG. 1 where a camera 118 can obtain an image of the lane marker type to the immediate left side and to the immediate right side of the vehicle, such as lane markers 218 and 220 for the position of the vehicle 200 in FIG. 1 in the middle lane 206. Alternately, when the camera 118 has a larger field of view, lane marker types at the far edges of the adjacent lanes, such as the lane markers 216 or 222 can also be obtained by the camera 118.

The camera 118 may be a black and white or color camera capable of sending images of the lane markers detected within the field of view of the camera 118 to the processor 102 which determines the lane marker type, (e.g. solid or dashed) from the camera images.

If a color camera 118 is employed, the typical yellow or white colors of the lane markers may also be detected in the images from the camera 118 and sent to the processor 102 to aid in identifying the lane marker type as being either solid or dashed.

The map data 116 can be digital map information stored in the memory 104 of the computing device 100, stored in the external storage 114, or can be made available to the processor 102 from a remote location, such as by wireless transmission from a digital map data source. The map data 116 can include the existence and the location of stubs or splits in a roadway, as well as the distance of the stubs from predetermined locations along the roadway in advance of each stub.

Map data 116 may also include a vehicle-driving history based on prior travels of vehicle along a particular segment of a roadway. Such data can be stored in the memory 104 or, in the external storage 114 or uploaded to a remote data memory.

The vehicle speed and distance traveled sensor 122 may take several different forms. The sensor 122 may employ a speed input from one of the vehicle's processor units or from the vehicle speedometer to determine vehicle speed.

The processor 102 may calculate the distance traveled at the current vehicle speed over a predetermined period of time to generate a vehicle speed and distance traveled output for the processor 102.

Alternately, the vehicle speed and distance traveled outputs of sensor 122 may be from separate sensors on the vehicle 200, such as the vehicle speedometer and the vehicle odometer, or electronic data signals generated by a central processing unit on the vehicle which receives the vehicle speed and distance traveled outputs of the speedometer or odometer.

The flowcharts shown in FIGS. 3-10 depict a sequence of operation or method steps of the road lane identification method and apparatus executed by the processor 102.

By way of convenience in the follow description, the lanes 204, 206 and 208 in the roadway 202 are also referred to as lane I.D. zero, lane I.D. one, lane I.D. two or lane I.D. n−1, where n is the total number of lanes in the roadway. The total number of lanes in the roadway 202 is obtained from the map data 116 using the instantaneous position of the vehicle 20 as determined by the GPS receiver sensor 120.

The method and apparatus also makes use of any detected lane crossing by the vehicle 200. Lane crossing occurs when the vehicle 200 completely moves across one of the lane markers 218 and 220, but does not cross the outermost lane markers 216 and 222. The lane marker crossing events are detected by the processor 102 from data sent by the camera 118 and stored for use in performing the method steps described hereafter.

The method and apparatus also make use of a predetermined travel distance. This predetermined travel distance is described in the following process steps as being 1,000 meters, by example. Any distance can be employed as the predetermined travel distance.

A confidence belief of the lane I.D. is generated by the method and apparatus to output the probability that the vehicle 200 is in a particular one of the lanes 204, 206 and 208. This confidence belief is based on any detected lane crossings, the number of lanes in the roadway 202, a history of lane marker types up to the predetermined travel distance, and the lane marker types at the instantaneous position of the vehicle 200 in the roadway 202. The confidence belief is constantly updated as the vehicle traverses the roadway 202 within a predetermined travel distance. Any lane crossing that is detected causes the processor 102 to reset the predetermined travel distance to a minimum or start value of, for example, 100 meters. Likewise, the predetermined travel distance value is reset to 100 meters when the vehicle 200 reaches the maximum predetermined distance of 1,000 meters, in the present example.

The present method and apparatus also make use of data relating to road junctions or stubs in the roadway 202. The stubs are splits or merges in the roadway 202 where the roadway 202 contains multiple sub paths after a stub, where each sub path can include one or more lanes.

The stub data is obtained from the map data 116 and supplied to the processor 102 as part of developing the confidence belief of which lane the vehicle 200 is currently in the roadway 202 in advance of an upcoming stub in the forward travel direction of the vehicle 200.

Figure 3:
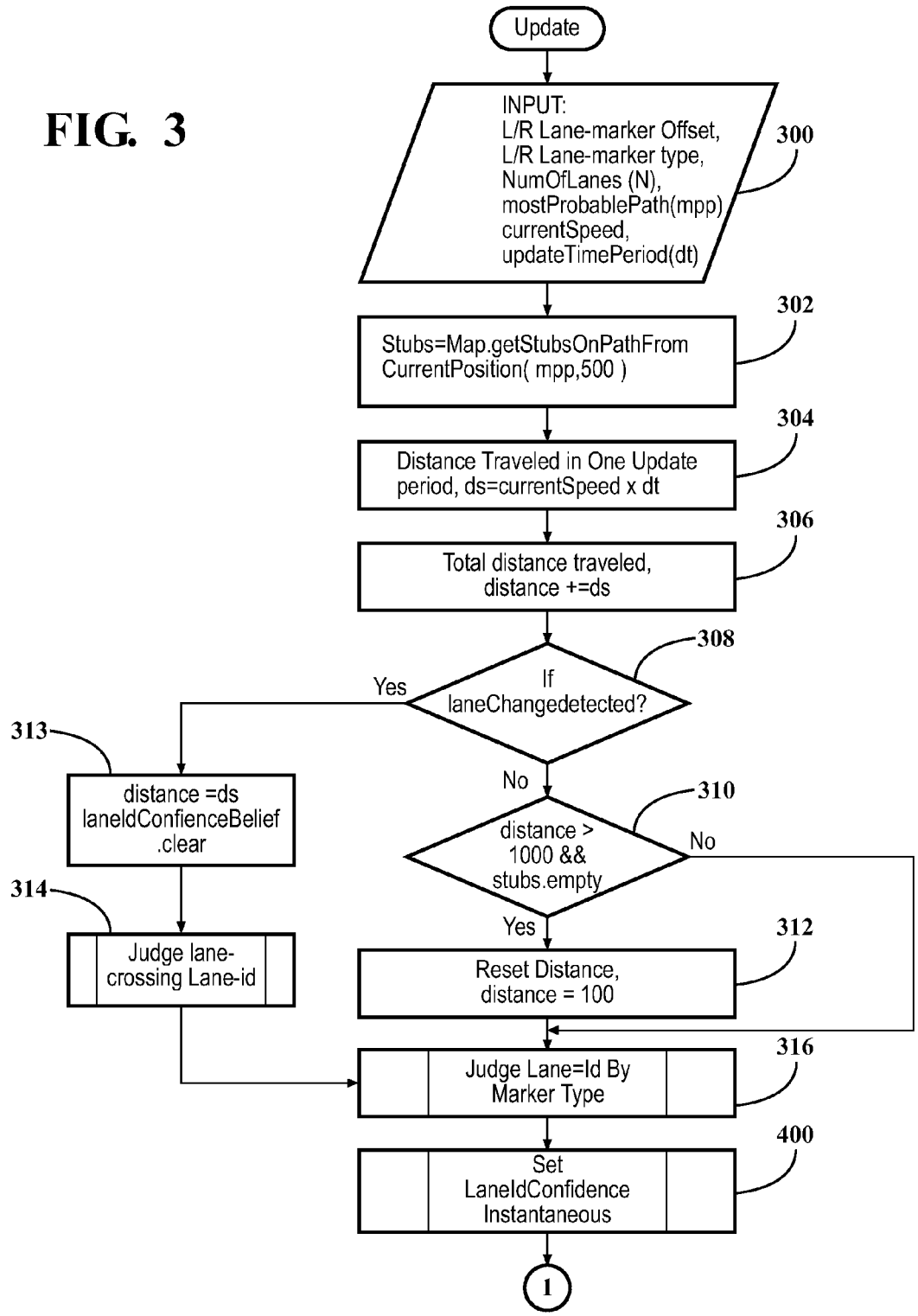
FIGS. 3-10 are logic flowcharts of the process performed by the present method and apparatus.

Referring now to FIG. 3, the processor 102 starts the execution of the lane identification method by inputting, in step 300, a number of inputs, such as left/right lane marker offset defining the distance of the center line of the vehicle 200 from the detected left lane marker and detected right lane marker, such as lane markers 218 and 220 in FIG. 1. Other inputs includes the left right lane marker type, the number of lanes (N), the most probable path to be taken by the vehicle in the roadway 202, the current speed of the vehicle, and an updated time period (dt) for use in determining the predetermined travel distance.

In step 302, the processor 102 receives stub information from the map data 116. For example only, the map data 116 identifies a stub instantaneous position with respect to the vehicle 200 in the roadway 202 at a predetermined minimum distance, such as 500 meters, for example, ahead of the current position of the vehicle 200.

In step 304, the processor 102 calculates the distance traveled in one update period, where the update period defines a portion of the predetermined travel distance. The current speed of the vehicle is multiplied by the time period (dt) to generate a total distance traveled in the update period in step 306.

The processor 102 then determines in step 308 if any lane change has been detected. If there is no lane change detected, and the predetermined travel distance is less than the example of 1,000 meters and the upcoming stub detection is empty or non-existent in step 310, the method advances to step 316 to judge the lane I.D. by the lane marker type.

However, if the distance traveled within the predetermined travel distance equals or is greater than 1,000 meters or a stub is detected within the predetermined advance distance of 500 meters ahead of the position of the vehicle 200, in step 310, the processor 102 in step 312, resets the predetermined travel distance to 100 meters to start a new travel period.

Alternately, if a lane change is detected in step 308, the total distance traveled by the vehicle within the time period is cleared in step 313. Next, in step 314, the processor 102 executes a sub-routine shown in FIG. 5 where the processor 102 checks if the current lane I.D. matches the left most lane I.D. (i.e. "0") in step 320. If the determination is yes, the unknown lane (lane X) is given a lane I.D. of zero in step 322 which, as described above, identifies the left most lane 204 of the roadway 202. If the lane I.D. does not match the left most lane 204, the processor 102 checks if the lane I.D. matches the right most lane in step 324. If the determination is yes, the method in step 326 identifies the unknown lane with a lane I.D. of N−1. In the present example, N=3 (three lanes) so the lane I.D. of the vehicle 200 is two, identifying the right most lane 208 of the roadway 202.

However, if a lane I.D. does not match the lane I.D. of the right most lane as determined in step 324, the processor 102 in step 328 checks if the current lane I.D. is greater than or equal to zero or less than or equal to N−1. If the determination is no, the processor 102 in step 330 assigns an output that the lane I.D. is unknown.

However, if the determination of step 328 is yes, the processor 102 in step 232 checks if the lane crossing event is a lane crossing to the left side of the vehicle in the roadway 202 in step 332. If the determination in 332 is no, the lane I.D. is incremented by one in step 334.

Alternately, if the determination in step 332 is yes, the processor 103 in step 336 decreases the lane I.D. by one which, in the present example of three road lane 204, 206 and 208 in the roadway 202 at the current instantaneous position of the vehicle 200 in the roadway 202, generates a lane I.D. of one. The processor than sequences to step 316 in FIG. 3 where a sub-routine shown in FIG. 6, is executed to judge the lane I.D. by the lane marker type.

Figure 6:
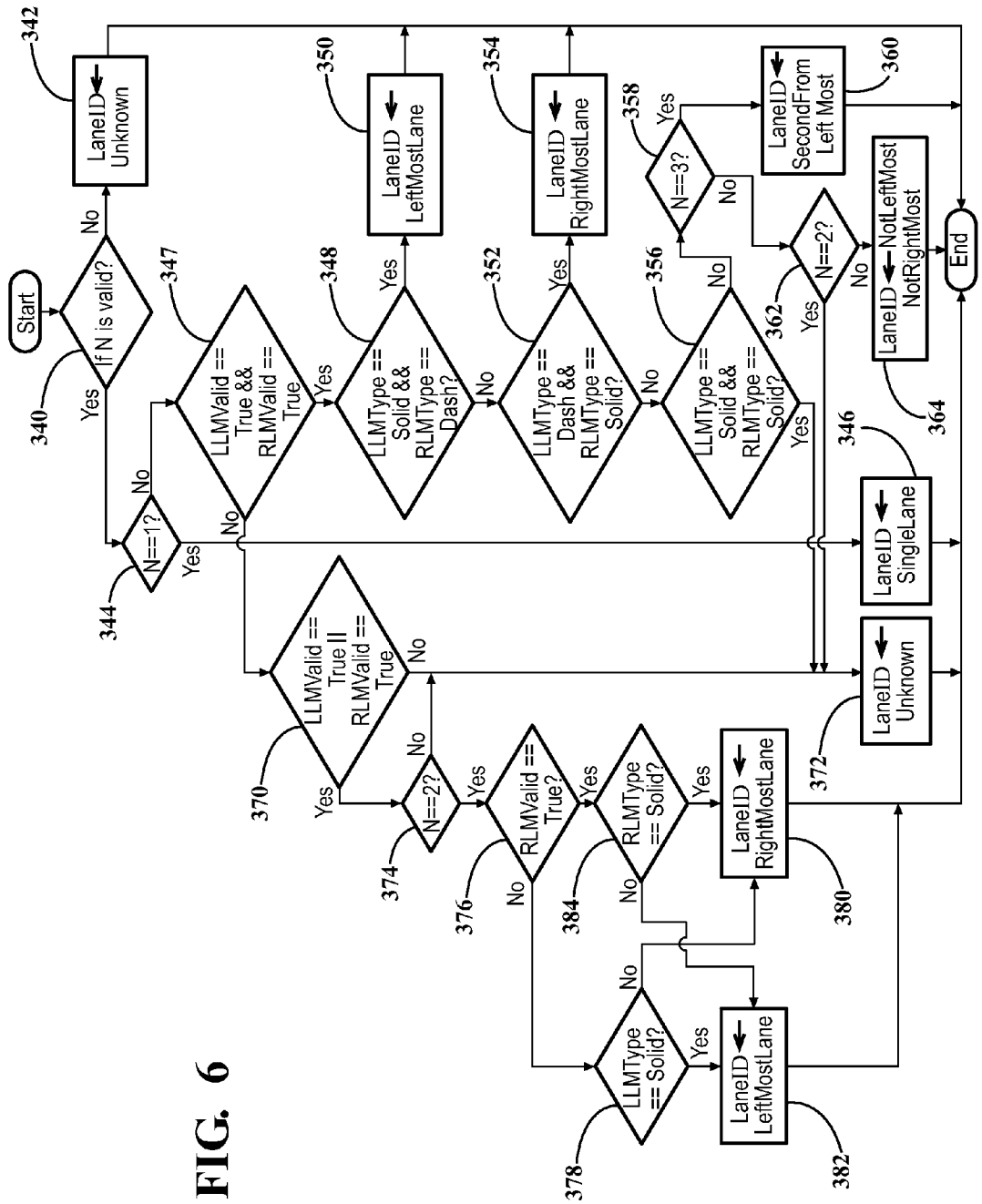

In the sequence shown in FIG. 6, where a determination is made of lane I.D. by lane marker type, the processor 102 in step 340 determines if N (number of lanes) is valid for the instantaneous position of the vehicle 200 in the roadway 202 using map data 116 to determine the number of lanes at the instantaneous position of the vehicle 200. If N is not valid, the method in step 340 sets the lane I.D. as unknown and ends the sub routine.

If N is valid as determined in step 342, the processor 102 in step 344 determines if N=1. If the determination is yes, the lane I.D. is determined to be a single lane in step 346 and the sub routine execution is also ended.

Alternately, if N does not equal 1 as determined in step 344, the method determines if the left lane and right lane markers are valid and true. If the determination is yes, in step 347, the processor 102 determines in step 348 if the left lane marker as viewed by the camera 118 is solid and the right lane marker is dashed. If the determination in step 348 is true or yes, the lane I.D. is set to the left most lane I.D., (zero in the present example) in step 350. If the determination in step 348 is untrue or no, the processor 102 determines in step 352 if the left lane marker type is dashed and the right lane marker type is solid. If this results in a true or yes determination, the lane I.D. is set to be the right most lane I.D. in step 354 (lane I.D.=N−1 or 2) in the present example of the roadway 202 containing three lanes 204, 206 and 208.

If the determination of step 352 is untrue or no, the processor 102 in step 356 determines if the left lane marker type is solid and the right lane marker type is solid. If the determination is yes, then the lane I.D. is identified as a single lane and the subroutine ends in step 346.

However, if the determination in step 356 is untrue or a no, step 358 is executed to determine if the number of lanes equals three. If the determination is yes, the lane I.D. is set to be second from the left most lane in step 360. If N does not equal three as determined by step 358, the processor 102 determines if N=2 in step 362. If yes, the lane I.D. is identified as a single lane in step 346. However, if the determination of step 362 is untrue or no, then the lane I.D. is set to be "not the left most lane and not the right most lane." This situation may occur in roadways 202 having four or more lanes.

Referring back to step 347 in FIG. 6, if the determination of step 346 is no, that is, one of the left lane marker or the right lane marker is not true and valid, i.e. split or dashed, the processor 102 in step 370 determines if the left lane is valid and true and the right lane marker is valid and true. If untrue, the lane I.D. is marked as unknown in step 372. Alternately, if the determination in step 370 is a yes or true, the processor 102 determines if the number of lanes in the roadway equals two in step 374. If the determination is no, the lane I.D. is set to be unknown in step 372. If yes, the processor 102 in step 376 determines if the right lane marker is valid and true. If no, the left lane marker type is checked in step 378 if it is solid. If the determination in step 378 is no, the lane I.D. is set to be the right most lane I.D. (N−1) in step 380. However, if the determination of step 378 is yes or true, the lane I.D. is set in step 382 as the left most lane I.D. (i.e., "0").

Referring back to step 376, if the right most lane marker is determined to be valid and true, the processor 102 determines in step 384 if the right lane marker type is solid. If the determination is yes, the lane I.D. is set to the right most lane I.D. (N−1) in step 380. If no, the lane I.D. is set to the left most lane I.D. (i.e., "0") in step 382.

Referring back to FIG. 3, after the completion of the subroutine in step 316, the processor 102 advances to step 400 to set the lane I.D. confidence belief instantaneous. The lane I.D. confidence belief is a vector formed of the lane I.D.s of each of the lanes 204, 206 and 208 as determined by the confidence belief that the vehicle 200 is in one of the lanes 204, 206 and 208 of the roadway 202, as described in the confidence belief vector as 0, 1, 0 in the example shown in FIG. 1, along with a calculated probability based on the amount of travel distance within the predetermined travel distance that the vehicle 200 has traveled since the last restart of the predetermined travel distance without any lane crossing being detected. The longer the vehicle 200 remains in the same lane along the predetermined travel distance, the higher the probability determined by the present method and apparatus of the lane I.D. Thus, the confidence belief vector for the vehicle 200 shown in FIG. 1 at the instantaneous position of the vehicle 200 in the roadway 202 is determined as 0, 1, 0 with a probability, for example, of (0.3, 0.5 and 0.2). Alternately, the probability could be, depending upon the actual distance traveled by the vehicle 200 within the predetermined travel distance, (0.1, 0.9, 0.0).

Figure 7:
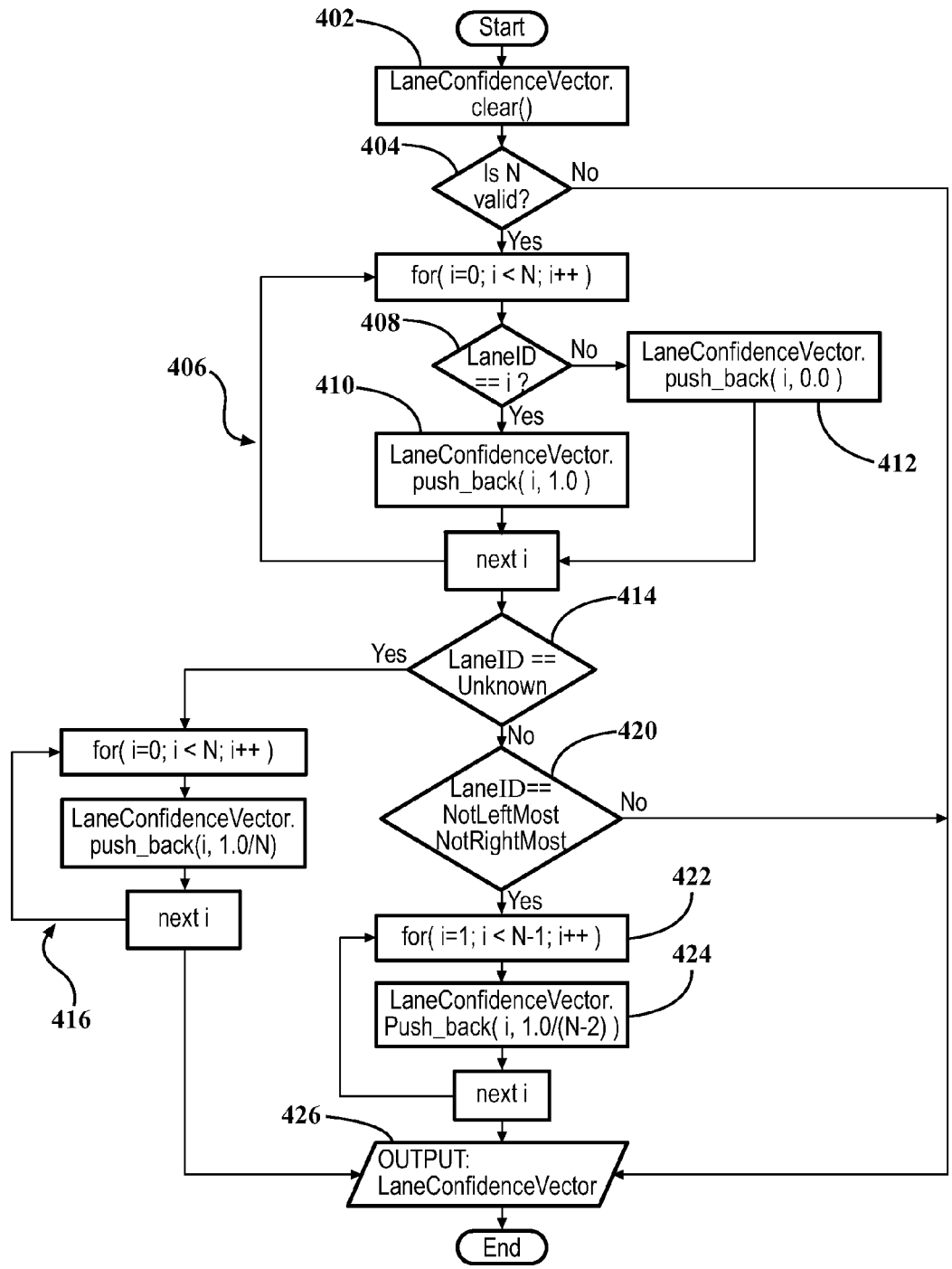

FIG. 7 depicts the sub routine executed by the processor 102 from step 400 which sets the lane confidence instantaneous vector. In step 402, the prior lane confidence vectors is cleared. In step 404, the number of lanes (N) is checked to be valid with the map data 116 indicating the number of lanes in roadway 202 at the instantaneous position of the vehicle 200 on the roadway 202. If N is not valid, control falls to the last step 426 in the sub routine, described hereafter.

If N is valid, a control vector is set up by checking for each lane number i=0, 1, and 2 or N−1 in the present example of three lanes 204, 206, and 208 in the roadway 202. If the present lane I.D. equals i in step 410, the lane control vector is pushed back as "1. If the lane I.D. does not equal "1", the lane confidence vector is pushed back in step 412 to "0". This loop 406 is repeated until all lane I.D.'s have been checked.

If the lane I.D. is unknown as determined in step 414, another control loop 416 is executed which sets each lane number to be 1/N or a probability of 0.33, 0.33 and 0.33 for the three lanes 204, 206, and 208. Once the execution of the loop 416 is completed, control falls to the output step 426 as described hereafter.

Referring back to step 414, if the lane I.D. is not unknown as determined by a yes in step 414, the lane I.D. is checked in step 420 to determine if it is not the left most and not the right most lane. If the determination is no or untrue, control falls to the output step 426 described hereafter.

If the output of the step 420 is yes, for each lane number less than the maximum number of lanes the lane confidence vector is pushed back and set to equal 1.0/N−2. For a five lane road, the LCV could be 0, 0, 1, 0, 0.

The lane control vector set in steps 412, 420, or steps 416 or 426 is then established as the lane I.D. confidence belief vector.

Figure 4:
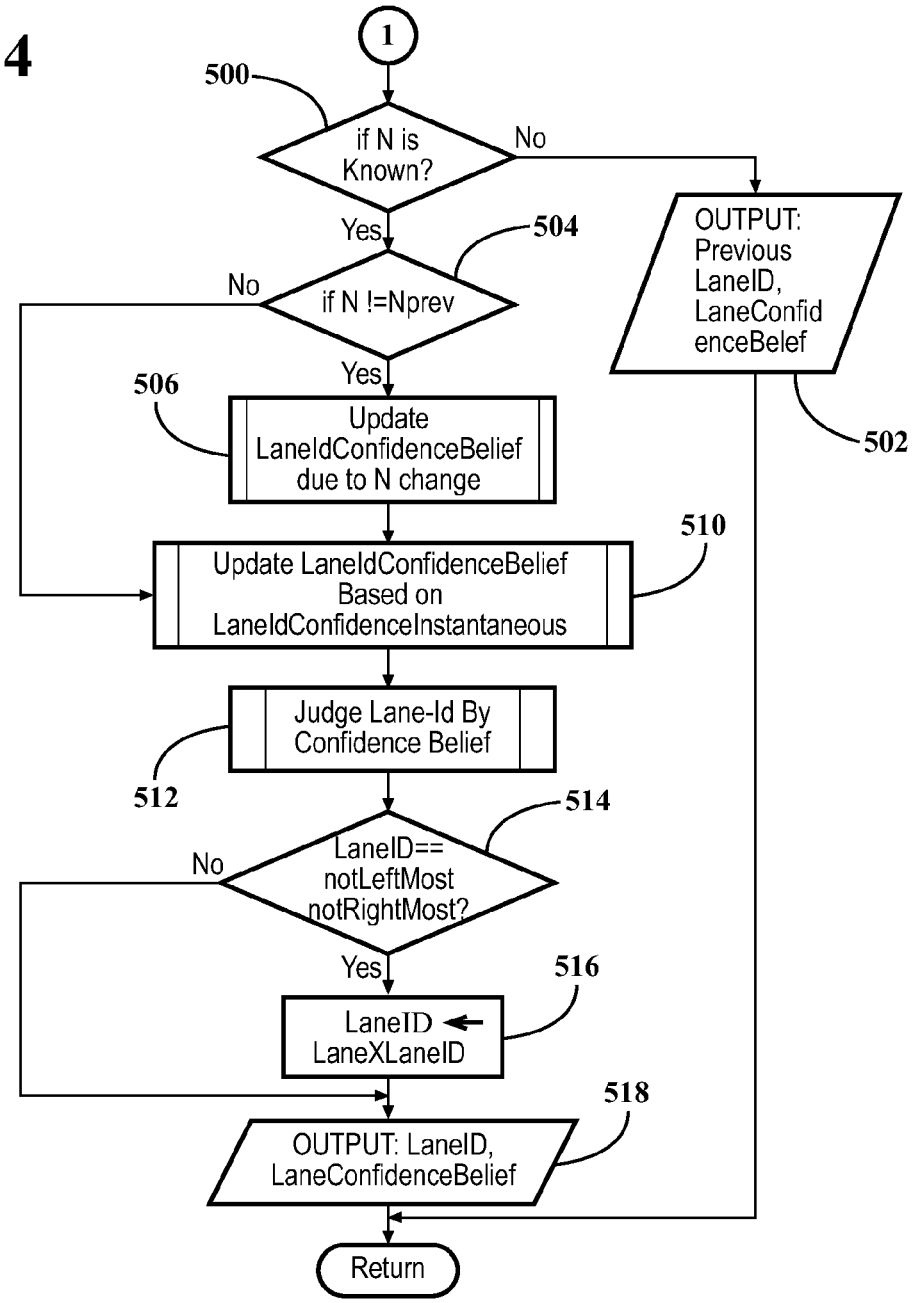
Figure 5:
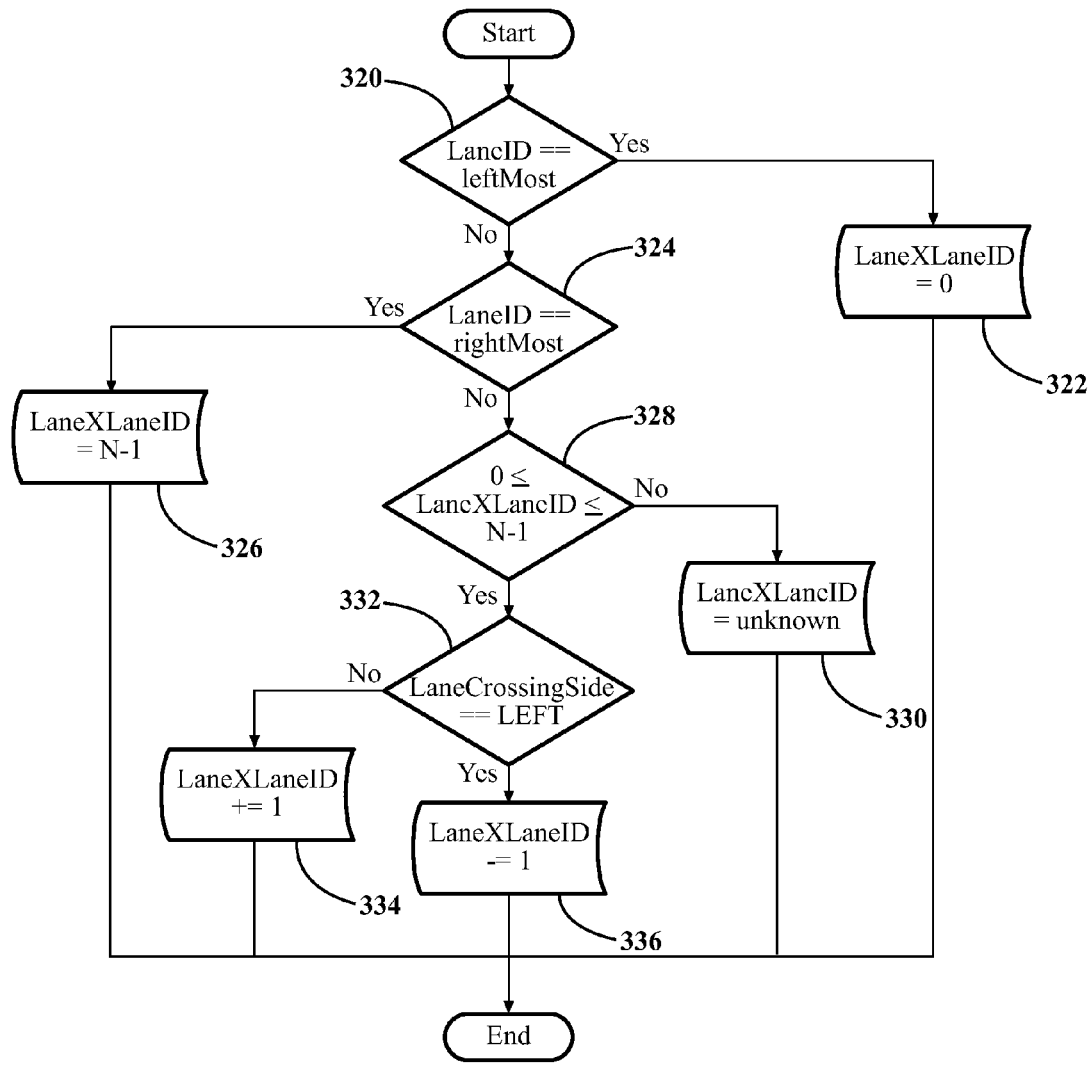

Control then returns to the main routine starting with step 500 in FIG. 4. If the number of lanes (N) is not known, the output of step 502 uses the previous lane I.D. lane confidence belief in step 502. If the number of lanes (N) is known from step 500, the processor 102 checks if the number of lanes (N) does not equal or match the previous number of lanes (N) in step 504. If N does not equal or match the previous N, from step 504, the processor 102 updates the lane confidence belief vector due to the change in the number of lanes (N) in step 506, which advances to the sub-routine shown in FIGS. 8A and 8B, step 600, which come into play when the number of lanes in the roadway changes, either by a decrease in the total number of lanes or an increase in the total number of lanes on either or both of the left and right sides of the roadway 202.

Figure 8A:
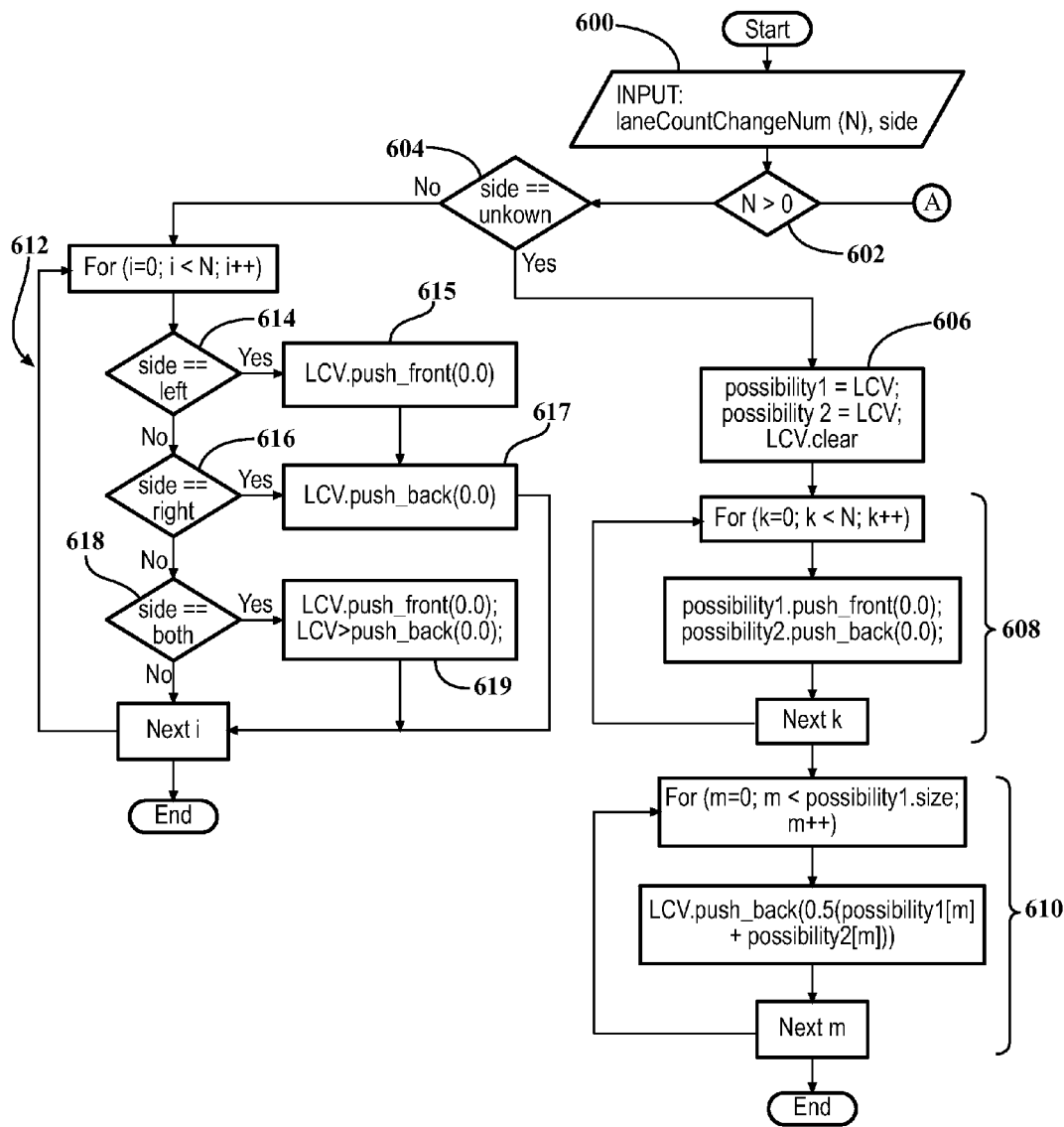
Figure 8B:
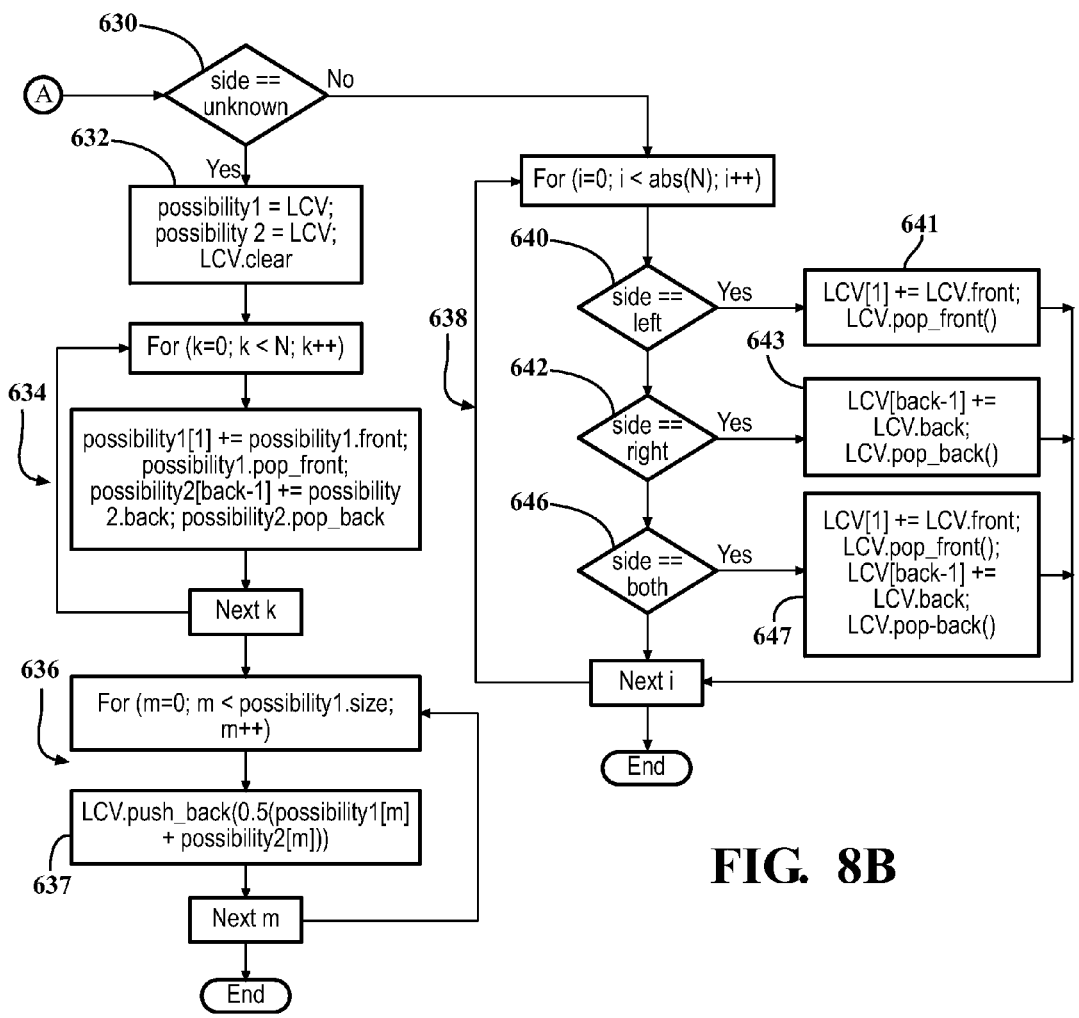

Referring to step 602 in FIG. 8A, the processor 102 executes a routine for a lane change where the side of the roadway 202 having a lane change is known or unknown in step 630, in FIG. 8B.

In step 604, if the side of the roadway 202 which has a lane added is not unknown, the processor 102 executes a subroutine loop 612 including steps 614, 616 and 618 for each lane I.D., i.e., i=0, 1, 2. For example, the processor 102 checks in step 614 if the lane was added at the left side of the roadway 202. If the determination is yes, the processor 102 changes the lane confidence belief lane I.D. number by pushing a zero to the front of the lane confidence belief in step 615. For example, if the lane confidence belief determined that the vehicle was in the left most lane for lane confidence belief probability of 1, 0, 0, the addition of a new lane on the left side of the roadway 202 causes the lane confidence belief probability to be 0, 1, 0, 0.

If the new lane is not added to the left side of the roadway 202, the processor 102 checks in step 616 if the new lane was added to the right side of the roadway 202. If the determination is yes, the processor 102 pushes the lane confidence vector back by adding a zero to the end of the lane confidence vector. Using the same example from step 614, if the vehicle was determined to be traveling in the left lane, lane I.D. 0, with a probability of 1, the previous lane confidence vector of 1, 0, 0 would be pushed back to 1, 0, 0, 0 after step 617.

If the determination from step 616 was no, the processor checks in step 618 if the new lane was added to both sides of the roadway. If the determination is yes in step 618, the processor in step 619 pushes a zero to both of the front and the back of the lane confidence vector. Using the same example from step 614, if the lane confidence vector was 1, 0, 0, and new lanes were added to both sides of the roadway 202, the new lane confidence vector would be 0, 1, 0, 0, 0.

The loop 612 is repeated for each lane I.D. number until all of the lanes are checked.

Conversely, if the determination of step 604 is that the side of roadway 202 where the new lane is added is unknown, the processor 102 advances to step 606. In step 606, the processor 102 establishes two possibilities for the lane confidence vector (LCV) and clears the existing LCV. Subroutine loop 608 is the executed using K as an index for the number of lanes less than the total N number of lanes. Possibility1 is a possibility that the new lane is being added on the left side of the roadway 202. Possibility2 is a possibility that the new lane is added on the right side of the roadway 202. In possibility1, the processor 102 pushes the LCV by adding a zero to the front of the LCV probability portion of the vector. Similarly, in the possibility2, a zero is added to the back of the probability vector. For example, if the roadway 202 originally contained three lanes and the probability of the vehicle is traveling in the left most lane for an LCV of 1, 0, 0, possibility1 has a LCV of 0, 1, 0, 0 and possibility2 is 1, 0, 0, 0. Next, sub routine loop 610 is executed for each number of lanes that have been added. The number of lanes that are added is obtained from the map data 116. The processor 102 in step 611, averages the two possibility1 and possibility2 vectors. In the example of the possibility1 and possibility2 vectors described above, the average probability becomes 0.5, 0.5, 0, 0.

Control then returns to step 602 and advances to step 630 in FIG. 8B for the situation where the number of lanes in the roadway 202 is reduced, such as from three lanes to two lanes. Similar routines as described above for FIG. 8A are repeated if the determination in step 630 is that the side of roadway 202 where the lane is removed is unknown. Steps in routine 632, 634, 636 and 637 are executed by the processor 102 in the same manner as the steps in routines 606, 608, 610 and 611 in FIG. 8A to determine an average lane confidence vector probability belief.

Similarly, where the side of the roadway 202 where the lane is removed is not unknown, control advances to sub-routine 638 which is similar to subroutine 612 in FIG. 8A. Subroutine 638 functions to set the lane confidence vector probabilities based on pushing the lane confidence vector probability forward or backward depending upon which side of the roadway the pre-existing lane was removed from.

Figure 9:
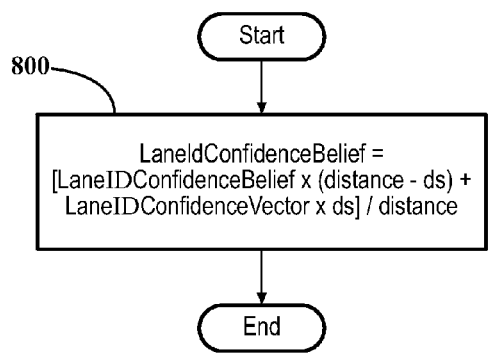

At the completion of the routines in FIGS. 8A and 8B, control returns to step 510 in FIG. 4 then moves to step 800, FIG. 9, where the lane I.D. confidence belief is updated based on the lane I.D. confidence instantaneous value. As shown in FIG. 9, step 800 updates the lane I.D. confidence belief.

The routine 800 shown in FIG. 9 updates the lane I.D. confidence belief based on the instantaneous lane I.D. confidence belief. This is an ongoing calculation for each sample time segment, such as every 0.2 seconds, for example during vehicle travel. The total predetermined distance segment, such as 1,000 meters described above as an example, is continuously calculated along with the distance (ds) traveled during the time elapsed between the previous sample and the current sample. The lane I.D. instantaneous confidence belief is calculated as follows:

$$Laneidconfidencebelief = \frac{[laneidconfidencebelief \times (distance\text{-}ds) + laneidconfidencevector \times (ds)]}{Distance}$$

The following example explains the calculation of the instantaneous lane I.D. confidence belief. If the historic lane confidence belief, prior to the current time sample period is 0.15, 0.8, 0.05 for the three lanes of the roadway 202 shown in FIG. 1, at a new sample, the lane I.D. confidence belief computed as LCV equals 0, 1, 0, for example. Using an example of vehicle speed as 30 meters per second, the distance (ds) traveled during the time elapsed between the previous sample and the current sample (0.2 seconds) equals 6 meters. If, for example, the total distance traveled during the current predetermined distance segment since the last distance reset in step 312, up to the current time, is 550 meters, then the new lane I.D. confidence belief is calculated as [0.1484, 0.802, 0.05]. This is an indication that the vehicle 200 has remained in the center lane for the incremental distance thereby increasing the lane I.D. confidence belief value that the vehicle 200 is in the center lane. Meanwhile, the lane I.D. confidence belief probabilities of the leftmost lane and the rightmost lane decrease or remain substantially the same.

In this manner, as the vehicle 200 progresses along the roadway 202 during each predetermined distance segment of 1,000 meters, for example, the instantaneous lane I.D. confidence belief is updated with the historic lane I.D. confidence belief.

Figure 10:
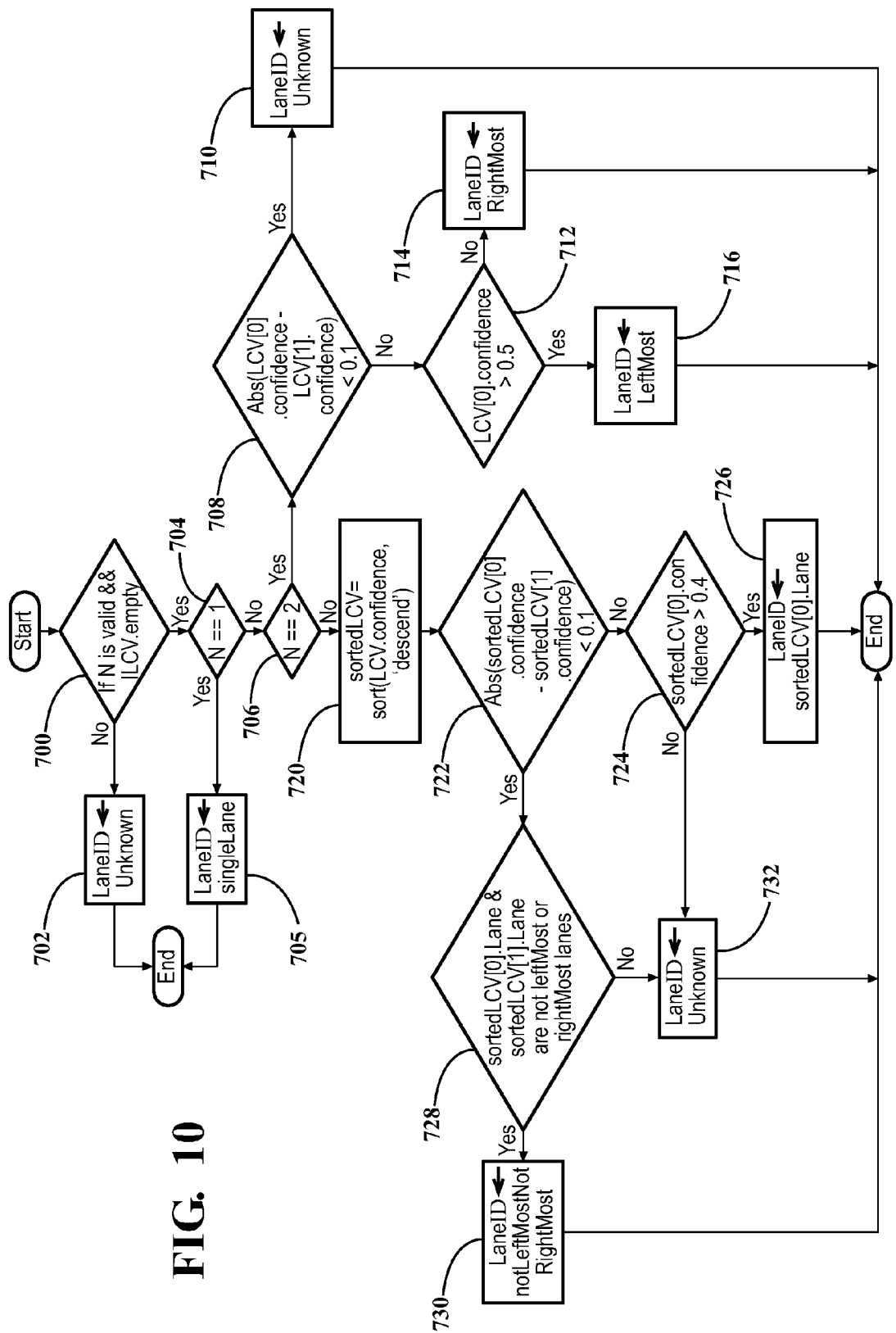

At the completion of step 800 in FIG. 9, the processor 102 returns to step 512 in FIG. 4 to judge the lane I.D. by the confidence belief. The subroutine shown in FIG. 10 is then executed.

First, in step 700, the processor 102 determines if the number of lanes is valid by comparison with the instantaneous map data and if the LCV is empty. If the determination is no, the lane I.D. is set to be unknown in step 702 and further processing ends.

Similarly, the determination in step 700 is yes or true, the processor 102 determines in step 704 if the number of lanes equals 1. If the determination is yes, the processor 102 sets the lane I.D. as a single lane in step 705 and further processing ends.

However, if the determination in step 704 is no, the processor 102 checks in step 706 if the number of lanes equals 2. If the number of lanes determined in step 706 does equal 2, the processor 102 executes step 708 which compares the absolute value of the lane confidence belief in lanes 0 and 1 for a two lane roadway as being less than 0.1. If the determination is yes, the processor 102 in step 710 sets the lane I.D. as being unknown and further processing ends.

However, if the determination of step 708 is no, that is, the confidence belief is greater than 0.1, the processor 102 checks in step 712 if the lane confidence belief of lane I.D. 0 is greater than 0.5. If no, the processor 102 sets the lane I.D. in step 714 as being the right most lane. However, if the lane confidence belief for lane I.D. 0 is greater than 0.5, the processor in step 716 sets the lane I.D. as being the left most lanes.

Referring back to step 706, if the number of lanes is greater than 2, as determined in step 706, the processor 102 in step 720 sorts the lane confidence vector values in descending order, such as 0.7, 0.2, 0.1 for a two lane roadway.

In step 722, the processor 102 sorts the absolute value of the lane confidence belief probabilities. Step 728 is checking for the middle lane of a multiple lane roadway. If the determination that the highest LCV probabilities are not for the leftmost and rightmost lane I.D.s, the lane I.D. is set to be not leftmost and not rightmost in step 730. However, if the highest two LCD probabilities are the leftmost or rightmost lanes, the processor 102 sets the lane I.D. as unknown in step 732.

Referring back to step 722, if the absolute sorted LCD confidence probabilities are not less than 0.1, that is, at least one of the probabilities is greater than 0.1, the processor 102 checks in step 724 if the highest sorted LCD confidence value is greater than 0.4. If the determination is yes, the lane I.D. is set to the highest LCD sorted probability lane. If not, the lane I.D. is set as unknown in step 732.

Control then returns to step 514 where the lane I.D. set in step 726 is determined whether it matches the leftmost or rightmost lane I.D. If the determination is yes, the processor 102 judges the lane I.D. in step 516 by the lane I.D. from the subroutine in FIG. 10 and outputs the lane I.D. confidence belief in step 518. If the lane I.D. in step 514 does not match the leftmost and rightmost lanes, the processor 102 advances to step 518 to output the lane I.D. and lane confidence belief.

What is claimed is:

1. A method of determining a lane identity in a roadway in which a vehicle is traveling, where the roadway contains a plurality of lanes comprising:
   obtaining, using one or more sensors, a lane marker type to a left side and to a right side of the vehicle in a forward direction of travel of the vehicle;
   obtaining, using one or more sensors, an instantaneous position of the vehicle on the roadway;
   determining, using map data, a number of lanes in the roadway at the instantaneous position of the vehicle;
   detecting, using one or more sensors, lane crossings of the vehicle between the plurality of lanes in the roadway; and
   generating a lane identification confidence belief indicating a probability that the vehicle is in a particular lane of the plurality of lanes of the roadway based on any detected lane crossings, the number of lanes in the roadway, a history of lane marker type up to a predetermined travel distance, and the lane marker type at the instantaneous position of the vehicle in the roadway,
   the lane identification confidence belief being calculated as:

$$\frac{[LCV(\text{distance-}ds) + \text{instantaneous } LCV \times ds]}{\text{distance}}$$

where LCV is a lane identification confidence belief prior to a current sample time, distance is the distance traveled by the vehicle since a last distance reset, ds is a distance traveled by the vehicle during the current sample time, and instantaneous LCV is the instantaneous lane identification confidence vector probability calculated at an instantaneous position of the vehicle in the roadway during the current sample time.

2. The method of claim 1, wherein obtaining, using one or more sensors, the lane marker type to the left side and to the right side of the vehicle in the forward direction of travel of the vehicle is performed at least in part using a camera mounted on the vehicle.

3. The method of claim 1, wherein:
   obtaining the instantaneous position of the vehicle on the roadway is performed by a global positioning satellite system, wherein at least a portion of the global positioning satellite system is carried by the vehicle.

4. The method of claim 1, wherein determining the number of lanes in the roadway at the instantaneous position of the vehicle uses data in a memory.

5. The method of claim 1, wherein detecting lane crossings of the vehicle between the plurality of lanes in the roadway is performed using a camera mounted on the vehicle.

6. The method of claim 1, wherein:
   the lane identification confidence belief is updated upon the detection of any lane crossings.

7. The method of claim 1, further comprising:
   outputting, using a processor, the lane identification in which the vehicle is currently traveling in the roadway and a probability that the vehicle is in the particular lane corresponding to the lane identification.

8. The method of claim 1, wherein the lane identification confidence belief is a vector formed of each lane identification in the roadway and a probability value that the vehicle is in each of the plurality of lanes in the roadway.

9. The method of claim 8, wherein:
the lane identification confidence belief varies during each time sample during a predetermined distance time segment since the last distance reset.

10. The method of claim 1, further comprising:
recalculating the lane identification confidence belief at each occurrence in a change of the number of lanes in the roadway.

11. The method of claim 10, further comprising:
recalculating the lane identification confidence belief depending upon whether a lane is added or removed from the roadway and on which side of the roadway the lane was added or removed.

12. The method of claim 1, further comprising:
recalculating the lane identification confidence belief upon detecting each lane crossing.

13. The method of claim 12, further comprising:
resetting the distance traveled by the vehicle since the last distance reset upon detecting each lane crossing.

14. A computer-implemented method of determining which lane of a roadway containing a plurality of lanes the vehicle is currently traveling comprising:
obtaining, using one or more sensors, a lane marker type to a left side and to a right side of the vehicle in a forward direction of travel of the vehicle;
obtaining, using one or more sensors, an instantaneous position of the vehicle on the roadway;
determining, using map data, a number of lanes in the roadway at the instantaneous position of the vehicle;
detecting, using one or more sensors, lane crossings of the vehicle between the plurality of lanes of the roadway; and
generating a lane identification confidence belief indicating a probability that the vehicle is in a particular lane of the plurality of lanes of the roadway based on a predetermined travel distance in a particular lane, any detected lane crossings, the number of lanes of the roadway, a history of lane marker type up to a predetermined travel distance, and a lane marker type at the instantaneous position of the vehicle in the roadway, the lane identification confidence belief being calculated as:

$$\frac{[LCV(\text{distance-}ds) + \text{instantaneous } LCV \times ds]}{\text{distance}}$$

where LCV is a lane identification confidence belief prior to a current sample time, distance is the distance traveled by the vehicle since a last distance reset, ds is a distance traveled by the vehicle during the current sample time, and instantaneous LCV is the instantaneous lane identification confidence vector probability calculated at an instantaneous position of the vehicle in the roadway during the current sample time.

15. The method of claim 14, further comprising:
using a camera, a GPS system and map data to respectively determine the instantaneous position of the vehicle on a roadway, the lane marker type to the left side and to the right side of the vehicle, and the number of lanes in the roadway at the instantaneous position of the vehicle.

16. The method of claim 14, further comprising:
identifying the lane in which the vehicle is currently traveling in the roadway using the lane identification confidence belief.

17. A computing apparatus associated with a vehicle for determining the lane identity of a vehicle traveling in a roadway having a plurality of lanes comprising:
a computing device including at least one processor mounted on the vehicle and coupled to sensors;
a memory for storing data and program instructions used by the at least one processor, where the at least one processor executes program instructions stored in the memory and one or more sensors mounted on the vehicle to detect lane marker type to a left side and a right side of the vehicle at each instantaneous position of the vehicle in the roadway as well as detecting lane crossings of the vehicle in the roadway, the computing device executing the program instructions for:
obtaining a lane marker type to a left side and a right side of the vehicle in a forward direction of travel of a vehicle from at least one of the sensors;
obtaining an instantaneous position of the vehicle on the roadway using one of the sensor and map data;
determining a number of lanes in the roadway at the instantaneous position of the vehicle using map data stored or accessible in the memory;
detecting lane crossings of the vehicle between the plurality of lanes in the roadway using one of the sensors; and
generating a lane identification confidence belief indicating a probability that the vehicle is in a particular lane of the plurality of lanes of the roadway based on any detected lane crossings, the number of lanes in the roadway, a history of lane marker type up to a predetermined travel distance of the vehicle along the roadway, and a lane marker type at the instantaneous position of the vehicle in the roadway, the lane identification confidence belief being calculated as:

$$\frac{[LCV(\text{distance-}ds) + \text{instantaneous } LCV \times ds]}{\text{distance}}$$

where LCV is a lane identification confidence belief prior to a current sample time, distance is the distance traveled by the vehicle since a last distance reset, ds is a distance traveled by the vehicle during the current sample time, and instantaneous LCV is the instantaneous lane identification confidence vector probability calculated at an instantaneous position of the vehicle in the roadway during the current sample time.

18. The computing apparatus of claim 17, wherein:
the sensors include at least one of a GPS receiver, a camera and a vehicle speed input.

* * * * *